3,033,771
METHOD FOR THE PREPARATION OF BINARY NITROGEN-FLUORINE COMPOUNDS

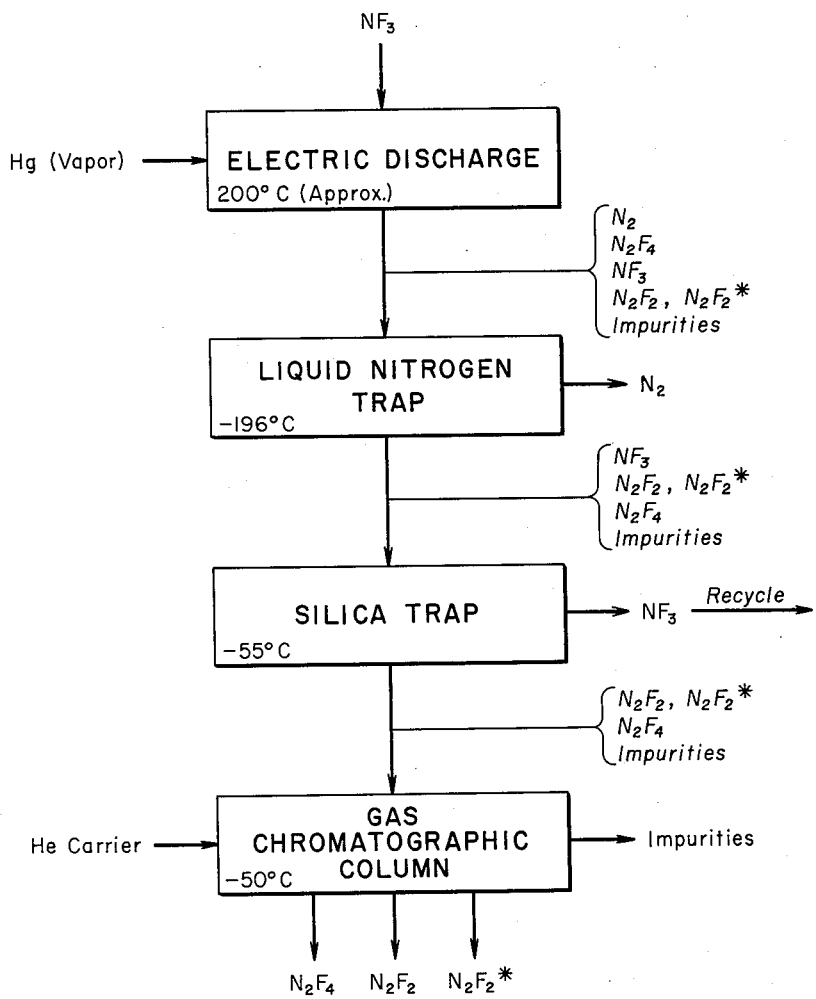

Jack W. Frazer, Livermore, Calif., assignor to the United States of America as represented by the United States Atomic Energy Commission
Filed Apr. 11, 1960, Ser. No. 21,571
7 Claims. (Cl. 204—177)

The present invention relates in general to the preparation of binary nitrogen-fluorine compounds and more particularly relates to a method for the preparation of tetrafluorohydrazine, $N_2F_4$, and the two isomeric forms of difluorodiazine, $N_2F_2$.

While a synthetic process for the formation of $N_2F_2$ is known since 1942, a method to synthesize $N_2F_4$ has only recently been described in the chemical literature, viz., C. B. Colburn and A. Kennedy, Journal of the American Chemical Society, volume 80, page 5004 (1958). According to that investigation tetrafluorohydrazine is produced by reacting nitrogen trifluoride, $NF_3$, in a flow reactor at 350° C. with certain metals, preferably bismuth, antimony, stainless steel or copper which act as fluorine acceptors. The reaction is represented by the following equation:

$$2NF_3 + M \rightarrow N_2F_4 + MF_2 \text{ (or } 2MF)$$

where M=fluorine acceptor.

Subsequently the resulting gas reaction mixture, consisting primarily of $N_2F_4$ and various gaseous side products, is then separated by passing the mixture through a chromatographic gas adsorption column, or by fractional condensation. A synthetic process similar to that described immediately above, utilizing different fluorine acceptors has also been reported. At any rate, by the methods heretofore practiced, the products are contaminated with undesirable side products, in particular carbon tetrafluoride, a compound which is separated only with great difficulty from $N_2F_4$. Hence, it becomes necessary to purify the commercially available material before it can be employed for some purposes outlined below. Purification of the presently available $N_2F_4$ is both time consuming and costly.

Tetrafluorohydrazine is employed in the synthesis of liquid propellant fuels and also as a reagent in the chemical explosives industry. Difluorodiazine also is used in the synthesis of new types of explosives since the compound contains the energy rich N—F bonds. Though it was not until 1958 that the preparation $N_2F_4$ first succeeded by the process outlined above, relatively large quantities of the gas are now prepared and used for the purposes stated above.

Now a new method has been discovered for effecting an efficient conversion of nitrogen-trifluoride to $N_2F_4$ and $N_2F_2$ in a homogeneous gas phase reaction, thereby producing the gas in a state essentially free from contaminating substances such as $CF_4$. Briefly, in the novel synthetic method, nitrogen trifluoride is rearranged in an electrical glow discharge tube in the presence of mercury and at elevated temperatures. The gaseous reaction products, principally $N_2F_2$ and $N_2F_4$ are subsequently passed through a fractionating trap system and eventually through a chromatographic gas separator. Not only is a very efficient conversion to the desired products obtained, but the products from this reaction may be obtained substantially pure allowing thereby the production and formation of other uncontaminated compounds, for which $N_2F_4$ and $N_2F_2$ are used as reagents. The high purity of the product $N_2F_2$ and $N_2F_4$ is evidenced by mass spectrometer analysis of samples from various experimental runs, which indicated, for instance, that $N_2F_4$ produced by the present process contains only $\leq 0.1\%$ of impurities, consisting predominantly of nitrogen oxides and silicon-tetrafluoride.

The invention is adaptable as a continuous process wherein the unused nitrogen trifluoride may be recovered and subsequently recycled. Any desired quantity may be produced by selection of proper equipment size and feed rate.

Accordingly it is an object of the present invention to provide a method for synthesizing tetrafluorohydrazine.

Another object of the invention is to synthesize the two isomers of difluorodiazine.

A further object of the invention is to employ an electrical glow discharge tube for the synthesis of $N_2F_2$ and $N_2F_4$.

Still another object of this invention is to provide an efficient method for the formation and subsequent separation of $N_2F_4$ and the isomers of $N_2F_2$ and to prepare these compounds essentially free of contaminants.

One other object of this invention is to provide a fractional condensation process wherein a mixture of $N_2F_2$ and $N_2F_4$ is collected as a condensation product and is later purified and separated by a chromatographic adsorption process.

Other objects and advantages of the invention will become apparent on consideration of the following description taken in conjunction with accompanying drawing of which the single FIGURE is a flow diagram of the process of invention.

With reference now to said drawing, in the operation of the process purified $NF_3$ gas, procured from commercial sources, is introduced from a reservoir into a standard alternating current electrical glow discharge tube at relatively low pressures. In addition a quantity of mercury is retained in the discharge tube. After the temperature of the tube has been adjusted to vaporize some of the mercury, a high voltage potential is applied to the electrodes. Now, as the electric field existing originally between the two electrodes breaks down, disarrangement and dissociation of the $NF_3$ molecules occurs and initially various free radicals, ions and excited molecules are formed. Subsequently the latter particles recombine to form a mixture of reaction products, in particular $N_2F_4$, $N_2F_2$, $N_2F_2^*$, $N_2$, $SiF_4$, $(HgF)_x$ and nitrogen oxides.

It has been found that the optimum yield of $N_2F_4$ and $N_2F_2$ depends on the potential difference across the electrodes, the purity of the starting material, the temperature of the reaction tube and the pressure of the $NF_3$ as it passes through the tube. All of these factors are in turn determined by the particular configuration and dimensions of the electrical glow discharge tube. Clearly, for instance, larger discharge apparatus will require higher voltages in order to bridge the gap between the electrodes. Thus, it becomes necessary to establish the characteristics of each particular discharge tube and its performance in the invention process to obtain optimum yields. There exists furthermore an upper voltage limit where the discharge is too violent, causing thereby a complete breakdown of the $NF_3$ molecules. Consequently little or no yield is then recovered.

The reaction has a somewhat critical dependence on temperature, since sufficient mercury must be vaporized to act as fluorine acceptors in the gas phase reaction. Also, the relative yield of $N_2F_2$ and in particular of the isomer of $N_2F_2$ which is active towards mercury and which is designated as $N_2F_2^*$ herein is slightly increased when operating the discharge tube at lower $NF_3$ pressures and higher current densities. Approximately 25 to 33% of the $N_2F_2$ yield consists of the active isomer $N_2F_2^*$.

In Table I there are shown representative results from four experimental runs typical of the reaction, utilizing a Pyrex glass discharge tube of a configuration and dimension as described in Example I, following:

TABLE I

| NF$_3$ Pressure (mm. Hg) | 1 | 2 | 3 | 4 |
|---|---|---|---|---|
| Approx. flow rate (cc./mm.) | 16 | 55 | 95 | 135 |
| N$_2$F$_4$ (cc. STP synthesized/hr.) | 40 | 87 | 144 | 150 |
| N$_2$F$_2$ (cc. STP synthesized/hr.) | 11 | 23 | 24 | 29 |
| Percent NF$_3$ consumed for a single pass through discharge tube | 16.2 | 9.3 | 6.6 | 5.7 |
| Percent yield N$_2$F$_4$ | 51 | 61 | 67 | 63 |
| Percent yield N$_2$F$_2$ | 14 | 16 | 12 | 12 |
| Discharge voltage | 2,900 | 3,650 | 4,400 | 5,100 |

From this table it is evident that the combined yield of N$_2$F$_4$ and N$_2$F$_2$ is as high as 79% in the invention process. It is noteworthy that the temperature of the discharge tube has to exceed 160° C. before these yields are realizable. Experiments conducted in the range between 40 and 160° C. produced little or no product.

The temperature of the discharge tube for the four experimental runs noted in Table I was between 200 and 210° C. and the current density estimated to be about 0.1 to 0.125 amp.

Now during the reaction in the electric discharge tube, atomic fluorine or gaseous fluorine ions are formed which readily combine with more electropositive elements to form fluorides, a fact indicated by the equation shown supra. While mercury is, of course, the primary fluorine acceptor in this process, forming (HgF)$_x$, a certain small amount of fluorine also interacts with the wall material of the discharge tube. For instance, by combining with the silicon of glass, small amounts of the gas, silicon tetrafluoride, are formed. The oxygen liberated from the silica in turn forms oxides by recombination with any free nitrogen which is also present in the tube. However, the aforementioned formation of mercury fluorides becomes advantageous in the present process, because as the reaction proceeds the mercury fluorides deposit on the inner wall surfaces of the discharge tube, forming in this manner a protective coating and effectively preventing thereby the continued formation of undesirable gaseous impurities, such as SiF$_4$ and nitrogen oxides.

As noted in the foregoing description, the products from the electric discharge reaction are certain solid mercury fluorides and a gaseous mixture, which comprises substantial amounts of the primary reaction products and some impurities.

Generally such gaseous mixture is separable into its constituent compounds by various means available to those skilled in the art, e.g., by a stepwise fractional condensation. In the present synthesis of binary nitrogen-fluorine compounds, a combination of cold trapping, adsorption trapping and chromatographic separation yields the desired pure products.

More particularly, as the first step of the separation process, the gaseous mixture formed in the discharge tube is pumped from the outlet of the discharge tube through a liquid nitrogen trap. At the temperature of −196° C. all the reaction products liquefy except nitrogen, which is therefore conveniently removed by pumping with a vacuum pump. Subsequently, the liquid nitrogen coolant is removed from the trap and the liquid mixture re-evaporates and is expanded through a trap filled with silica gel maintained at a temperature of −55° C. Except for unreacted NF$_3$, all products are adsorbed by the silica gel therein. On account of the relatively high vapor pressure of NF$_3$ at −55° C. about 90% of the unreacted NF$_3$ is eluted through the silica trap in a short time. Without difficulty the recovered NF$_3$ is then returned to a constant pressure reservoir for recycle use. After separating the NF$_3$, the low temperature control is removed and the silica trap is allowed to warm up to room temperature. Desorption of the previously absorbed substances, i.e., N$_2$F$_2$, N$_2$F$_4$ and N$_2$F$_2$* begins during warm up and after collecting in suitable containers preferably at liquid nitrogen temperature, the desorbed and recondensed vapors are transferred to a chromatographic separation column. Alternately the desorbed vapors may be pumped directly to the chromatographic column. While a number of gas carriers are suitable for the chromatographic separator process, helium is preferred herein. In a conventional manner the gaseous mixture is then carried along with the helium stream through a long silica gel filled column maintained at a temperature of −50° C. N$_2$F$_4$, N$_2$F$_2$ and the active isomer N$_2$F$_2$* are collected separately as in a conventional gas chromatographic process.

The following example presents a specific illustration of the operation of the process of the invention:

*Example I*

For the synthesis of N$_2$F$_4$ and N$_2$F$_2$ a Pyrex glass apparatus was assembled, which comprised primarily the following components: a constant pressure reservoir, a butylphthalate manometer, a standard H-shaped alternating current discharge tube, a liquid nitrogen trap, a trap filled with silica gel and an eight foot long chromatographic gas separator column also filled with silica gel of 60–200 mesh size. More specifically, the discharge tube had the following dimensions: length of vertical arms about 20 cm., the outer diameter of the Pyrex glass arms about 4.2 cm., the length of the horizontal connecting tube about 5 cm., thus a distance of about 9 cm. separated the two electrodes, which were centered at the bottom of each vertical arm, and extended inwardly. Liquid mercury partially surrounded the electrodes. The discharge tube was placed in an air furnace. Only the gas inlet and outlet, namely, the upper section of the vertical arms were outside the furnace and furthermore were air cooled during the experimental runs.

Describing now a particular run, nitrogen trifluoride was purified at the outset of the experiment by passing it through a liquid argon trap before storage in the constant pressure vessel. With the aid of the butylphthalate manometer the initial volume of the stored NF$_3$ was determined as the average of three measurements and found to be 354.3 cc. at a temperature of 23.4° C. The discharge tube was heated by means of the air furnace to a constant temperature of about 200° C. Nitrogen trifluoride was then pumped into the discharge tube under a constant pressure of 3 mm. Hg from the reservoir, while a potential difference of 4,400 volts was maintained between the electrodes. This voltage was produced from an input of about 25 volts to a 117–15,000 volt transformer. A current density of about 0.12 amp. was measured. Six periods of electric discharge took place within the discharge tube with a total running time of 16.5 minutes, forming the reaction products by the following general equation:

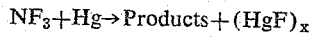

$$NF_3 + Hg \rightarrow Products + (HgF)_x$$

Leaving the discharge tube via the air cooled outlet, the gaseous reaction products passed through a liquid nitrogen trap at −195° C. where a vacuum pump removed the uncondensable nitrogen gas.

Subsequently the remaining mixture of reaction products was heated past their vaporization points and was pumped to and adsorbed by the silica gel in the second trap, which was maintained at a temperature of −55° C. by a liquid nitrogen cooled ethyl alcohol bath. At this temperature N$_2$F$_4$, N$_2$F$_2$ as well as other impurities present in the mixture were effectively adsorbed, except for the unreacted NF$_3$ which eluted through the silica gel trap in about 5 minutes. About 9.4 cc. representing about 17.4% of the yield of NF$_3$ was separated from the reaction mixture, collected and eventually recycled to the reservoir. Upon completion of the NF$_3$ separation the ethyl alcohol cooling bath was removed and the silica trap permitted to warm up to room temperature, thereby releasing the adsorbed reaction products as gases from the silica trap. The released gases were subsequently collected in containers at liquid nitrogen temperature. In the apparatus a parallel fractionating system comprising a second group of a liquid nitrogen and silica gel trap was used. Consequently it was possible to operate the discharge tube almost continuously with a minimum of $NF_3$. Whenever in one trapping system the silica gel trap had adsorbed the reaction mixture to its capacity and was undergoing the $NF_3$ separation, the reaction products coming from the discharge tube were diverted into the other system.

The mixture of gases comprising now chiefly $N_2F_2$ and $N_2F_4$, which was collected at liquid nitrogen temperature, as described above, was finally fractionated by a gas chromatographic separation process, wherein helium gas was employed as the carrier gas. From the eight foot long silica gel column 6.3 cc. of $N_2F_2$ and 37.6 cc. of $N_2F_4$ were collected in that order at a temperature of the column of $-50°$ C. The collected products represented at 12% and 71.4% yield respectively. Over-all conversion was therefore 83.4%. In this particular case the two isomers of $N_2F_2$ were collected as a single fraction even though chromatographic separation is readily accomplished. Again three determinations of the remaining volume of $NF_3$ were made and the average calculated as 239.6 cc. Taking into consideration the amount of $NF_3$ recovered during fractionation in the silica trap, a total of 105.3 cc. nitrogen trifluoride was used during the reaction. A combined amount of 43.9 cc. of reaction products was collected. From the yield data and the total running time it was determined that 136 cc. $N_2F_4$/hour and 22.8 cc. $N_2F_2$/hour were synthesized in the described apparatus under the conditions stated.

It is to be understood that the form of my invention, herein shown and described, is to be taken as a preferred example of the same, and that various modifications may be made therein without departing from the concepts of the invention and it is intended to cover all such as fall within the scope of the appended claims.

What is claimed is:

1. A process for producing tetrafluorohydrazine and difluorodiazine comprising the steps of passing an alternating current electrical glow discharge through gaseous nitrogen trifluoride in the presence of mercury vapors whereby said nitrogen trifluoride is reformed into a gaseous product comprising tetrafluorohydrazine, difluorodiazine and impurities, removing the impurities from said product, and separating and collecting tetrafluorohydrazine and difluorodiazine.

2. The process of claim 1 wherein the gaseous nitrogen trifluoride is maintained at a temperature of about 200° C.

3. The process of claim 1 wherein mercury vapors are present in the nitrogen trifluoride in an amount sufficient to combine with any free fluorine formed during the electrical discharge.

4. The process of claim 1 wherein the gaseous product is subjected to fractional condensation to eliminate nitrogen and nitrogen trifluoride therefrom, and the tetrafluorohydrazine and difluorodiazine are separated from the remaining impurities in a gas chromatographic column.

5. In a process for producing tetrafluorohydrazine and difluorodiazine the steps comprising passing an alternating current electrical glow discharge at a current density of about 0.1 to 0.125 ampere through gaseous nitrogen trifluoride in the presence of mercury vapors while maintaining the gaseous nitrogen trifluoride and mercury vapors at a temperature greater than 160° C., whereby said nitrogen trifluoride is converted into a gaseous product comprising a mixing of tetrafluorohydrazine, difluorodiazine and impurities including nitrogen and unreacted nitrogen trifluoride, passing said gaseous product into a trap maintained at about $-196°$ C. to freeze tetrafluorohydrazine and difluorodiazine and at least the nitrogen trifluoride impurity, pumping and discarding the nitrogen impurity from said trap, warming said trap to vaporize tetrafluorohydrazine and difluorodiazine and nitrogen trifluoride impurity, passing the vaporized products through a silica gel trap maintained at about $-55°$ C. wherein the tetrafluorohydrazine and difluorodiazine are retained, pumping the nitrogen trifluoride impurity from said trap, warming said trap to volatalize the tetrafluorohydrazine and difluorodiazine, chromatographically separating said products, and separately collecting the tetrafluorohydrazine and difluorodiazine.

6. The process of claim 5 wherein the by-product nitrogen trifluoride is recycled into the electrical discharge.

7. The process of claim 5 wherein the tetrafluorohydrazine and difluorodiazine are chromatographically separated at a temperature of about $-50°$ C.

References Cited in the file of this patent

UNITED STATES PATENTS

| | | |
|---|---|---|
| 2,736,694 | Ganning et al. | Feb. 28, 1956 |
| 2,849,357 | Devins et al. | Aug. 26, 1958 |
| 2,972,519 | Lipscomb | Feb. 21, 1961 |

OTHER REFERENCES

Colburn et al.: Journal of the American Chem. Soc., vol. 80 (1958), page 5004.

Le Roy: Canadian Chemistry and Process Industries (June 1944), pages 430, 431, 451.